US012244596B2

(12) United States Patent
Cruz Benito et al.

(10) Patent No.: US 12,244,596 B2
(45) Date of Patent: Mar. 4, 2025

(54) NATURAL LANGUAGE PROCESSING FOR RESTRICTING USER ACCESS TO SYSTEMS

(71) Applicant: INTERNATIONAL BUSINESS MACHINES CORPORATION, Armonk, NY (US)

(72) Inventors: Juan Cruz Benito, Salamanca (ES); Iván Durán Martínez, Vigo (ES); Sanjay Kumar Lalta Prasad Vishwakarma, Sunnyvale, CA (US); Sanket Panda, South Grafton, MA (US); Francisco Jose Martin Fernandez, Ridgefield, CT (US); Ismael Faro Sertage, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 484 days.

(21) Appl. No.: 17/564,168

(22) Filed: Dec. 28, 2021

(65) Prior Publication Data

US 2023/0208841 A1 Jun. 29, 2023
US 2024/0039919 A9 Feb. 1, 2024

(30) Foreign Application Priority Data

Oct. 27, 2021 (EP) .................................. 21382970

(51) Int. Cl.
*H04L 9/40* (2022.01)
*G06F 40/205* (2020.01)
*G06F 40/295* (2020.01)

(52) U.S. Cl.
CPC .......... *H04L 63/101* (2013.01); *G06F 40/205* (2020.01); *G06F 40/295* (2020.01); *H04L 63/102* (2013.01)

(58) Field of Classification Search
CPC ... H04L 63/101; H04L 63/102; G06F 40/205; G06F 40/295; G06N 3/08
See application file for complete search history.

(56) References Cited

U.S. PATENT DOCUMENTS 8,423,563 B2 * 4/2013 McPeake .......... G06F 16/90344
382/173
9,190,055 B1 11/2015 Kiss et al.
(Continued)

FOREIGN PATENT DOCUMENTS

CN 103107948 A 5/2015
CN 107516044 A 12/2017
(Continued)

OTHER PUBLICATIONS

International Search Report and Written Opinion issued Dec. 14, 2022 in related application No. PCT/CN2022/120913, 9 pgs.
Mell, P. et al., "Recommendations of the National Institute of Standards and Technology"; NIST Special Publication 800-145 (2011); 7 pgs.
Disclosed Anonymously, "Extending the Output Values of Storage ACLs to Control Restricted Access"; IP.Com (2014); 4 pgs.
(Continued)

*Primary Examiner* — Christopher A Revak
(74) *Attorney, Agent, or Firm* — Intelletek Law Group, PLLC; Gabriel Daniel, Esq.

(57) ABSTRACT

A method and system determine network based access to restricted systems. The method includes receiving a request for a permission access status of a party seeking access to one of the restricted systems. A database of periodically updated lists of entities is accessed. A name of the party is extracted from the request. A determination is made whether the name does not match one of the entities. The name is decomposed into parts if the name not matching one of the entities. A determination is made whether any of the parts of the name matches one of the entities. A denial of access status is forwarded from the computer server to an external computing device if any of the parts of the name matches one of the entities.

20 Claims, 6 Drawing Sheets

(56) References Cited

U.S. PATENT DOCUMENTS

| | | | |
|---|---|---|---|
| 10,042,993 B2 | 8/2018 | Beigi | |
| 10,282,389 B2 | 5/2019 | Liang et al. | |
| 10,530,776 B2 | 1/2020 | Grant et al. | |
| 10,701,079 B1* | 6/2020 | Ledet | H04L 63/102 |
| 10,999,281 B2 | 5/2021 | Parikh et al. | |
| 11,003,705 B2 | 5/2021 | Van Der Stockt et al. | |
| 11,038,897 B1* | 6/2021 | Wilson | H04L 63/104 |
| 11,366,798 B2* | 6/2022 | Guggilla | G06N 5/022 |
| 11,625,931 B2* | 4/2023 | Chiba | G06V 30/19093 |
| | | | 382/229 |
| 2011/0131652 A1 | 6/2011 | Robinson et al. | |
| 2014/0156263 A1* | 6/2014 | Patman Maguire | G06F 40/295 |
| | | | 704/9 |
| 2017/0083924 A1 | 3/2017 | Shah | |
| 2017/0293756 A1 | 10/2017 | Brown et al. | |
| 2017/0372232 A1* | 12/2017 | Maughan | G06F 3/0482 |
| 2018/0007053 A1 | 1/2018 | Grant et al. | |
| 2019/0228411 A1* | 7/2019 | Hernandez-Ellsworth | |
| | | | G06Q 20/40 |
| 2020/0014697 A1 | 1/2020 | Karin et al. | |
| 2021/0209172 A1* | 7/2021 | Whaley | G06F 16/90344 |
| 2022/0182410 A1* | 6/2022 | Tupsamudre | H04L 63/1483 |
| 2023/0205899 A1* | 6/2023 | Harres | G06F 21/6218 |
| | | | 726/28 |

FOREIGN PATENT DOCUMENTS

| | | | | |
|---|---|---|---|---|
| CN | 110442312 A | | 11/2019 | |
| CN | 116094780 A | * | 5/2023 | G06F 16/2246 |
| TW | 202123036 A | | 6/2021 | |
| WO | 2019227576 A1 | | 12/2019 | |

OTHER PUBLICATIONS

Disclosed Anonymously, "Providing Help as a Service Using a Natural Language Question Answer System"; IP.Com (2014); 5 pgs.

Disclosed Anonymously, "Natural Language Distribution Lists"; IP.Com (2014); 3 pgs.

Disclosed Anonymously, "Implementing Multi Level Security in Cognitive Computing (data mining)"; IP.Com (2019); 6 pgs.

Internet Article, "FortiGuard Security Services", Fortinet (2021); 8 pgs.

Internet Article, "Hardening Network Devices"; National Security Agency (2020); 3 pgs.

Burton, R. et al., "Whitelists that Work: Creating Defensible Dynamic Whitelists with Statistical Learning", IEEE (2019), 10 pgs.

Jain, A. K. et al., "A Novel Approach to Protect Against Phishing Attacks at Client Side Using Auto-Updated White-List", EURASIP Journal on Information Security (2016), 11 pgs.

Krivosheev, E. et al., "Business Entity Matching with Siamese Graph Convolutional Networks", arXiv e-prints (2021): arXiv-2105, 3 pgs.

Pang C. et al., "Privacy-Preserving Fuzzy Matching Using a Public Reference Table", In: McClean S., Millard P., El-Darzi E., Nugent C. (eds) Intelligent Patient Management. Studies in Computational Intelligence (2009), vol. 189. Springer, Berlin, Heidelberg. https://doi.org/10.1007/978-3-642-00179-6_5, 19 pgs.

Santos, R. et al., "Toponym Matching Through Deep Neural Networks", International Journal of Geographical Information Science (2009), 25 pgs.

Mudgal, S. et al., "Deep Learning for Entity Matching: A Design Space Exploration", Proceedings of the 2018 International Conference on Management of Data (SIGMOD 2018). Association for Computing Machinery, New York, NY, USA, 19-34. DOI:https://doi.org/10.1145/3183713.3196926, 16 pgs, (2018).

* cited by examiner

NATURAL LANGUAGE PROCESSING FOR RESTRICTING USER ACCESS TO SYSTEMS

BACKGROUND

Technical Field

The present disclosure generally relates to networking systems, and more particularly, to natural language processing for restricting user access to systems.

Description of the Related Art

A Denied Parties List (DPL) is a compiled listing of companies, organizations and individuals identified and published by various U.S. Government and/or foreign Governments and Agencies, for whom business may be prohibited to one degree or another. All customers and suppliers/vendors are typically screened against global denied parties lists prior to any business activity.

All the global software products/services typically check for anyone included in this list to see if the party is blocked when trying to use the product or service. Denied Parties Lists are updated frequently, so the users registered on the different services are reviewed regularly.

Currently, the process for reviewing the list of users in a DPL is a heavy task. Industry-standard know-your-customer products offer custom systems. The list checked is usually from a single source so entities appearing on one list do not necessarily appear on multiple or all lists. Current products also lack a strong approach to deal with new suspect entities that are not in the denylist/allowlist. Some parties may evade detection by slightly modifying their name in a variation that is not yet flagged across lists.

SUMMARY

According to an embodiment of the present disclosure, a computer implemented method for determining network based access to restricted systems is disclosed. The method includes receiving a request for a permission access status of a party seeking access to one of the restricted systems. A database in a computer server is accessed. The database includes a periodically updated list of entities. A name of the party is extracted from the request. A determination is made whether the name does not match one of the entities in the periodically updated list of entities. The name is decomposed into parts in response to the name not matching one of the entities. A determination is made whether any of the parts of the name match one or more of the entities in the periodically updated list of entities. A denial of access status is forwarded from the computer server to an external computing device in response to the any of the parts of the name matching one of the entities in the periodically updated list of entities.

According to one embodiment, the method further includes forwarding the parts to a neural network model in response to any of the parts not matching one of the entities in the periodically updated list of entities. The neural network model predicts whether the received name or any of its parts may be one of the entities in the periodically updated list of entities. An engine operating the neural network model recommends flagging the extracted name as one of the entities in the periodically updated list of entities.

The feature of using a neural network provides an advantage over prior art approaches that merely use for instance, raw or fuzzy queries. The results of a raw or fuzzy query may be unreliable as to whether a submitted name is one of the entities on a denial list because raw of fuzzy queries may require an exact match. The neural network is trained to identify names that may not be exact matches but may include characteristics of other entity names that are on denial lists. Accordingly, the results from a neural network improve the rate of identifying potential entities that are restricted from accessing some systems by an appropriately configured computing device.

According to an embodiment of the present disclosure, a computer program product for determining network based access to restricted systems is provided. The computer program product includes one or more computer readable storage media, and program instructions collectively stored on the one or more computer readable storage media. The program instructions include receiving a request for a permission access status of a party seeking access to one of the restricted systems. A database in a computer server is accessed. The database includes a periodically updated list of entities. A name of the party is extracted from the request. A determination is made whether the name does not match one of the entities in the periodically updated list of entities. The name is decomposed into parts in response to the name not matching one of the entities. A determination is made whether any of the parts of the name match one or more of the entities in the periodically updated list of entities. A denial of access status is forwarded from the computer server to an external computing device in response to the any of the parts of the name matching one of the entities in the periodically updated list of entities.

According to one embodiment, the database includes a custom collection of entities flagged with exceptions indicating an allowed access status to the one or more of the restricted systems. The custom collection of entities provides increased flexibility in the denial or permission of parties seeking access to some systems. It may be the case that an entity is restricted from accessing one system but may have an exception to access a different system. Current DPLs on the other hand, deny an entity altogether from restricted systems if the entity is flagged as blocked for one system.

According to an embodiment of the present disclosure, a computer server is disclosed. The computer server includes: a network connection; one or more computer readable storage media; a processor coupled to the network connection and coupled to the one or more computer readable storage media; and a computer program product including program instructions collectively stored on the one or more computer readable storage media. The program instructions include receiving a request for a permission access status of a party seeking access to one of the restricted systems. A database in the computer server is accessed. The database includes a periodically updated list of entities. A name of the party is extracted from the request. A determination is made whether the name does not match one of the entities in the periodically updated list of entities. The name is decomposed into parts in response to the name not matching one of the entities. A determination is made whether any of the parts of the name match one or more of the entities in the periodically updated list of entities. A denial of access status is forwarded from the computer server to an external computing device in response to the any of the parts of the name matching one of the entities in the periodically updated list of entities.

According to one embodiment, the program instructions further comprise receiving updated permission access statuses of the entities from a plurality of different sources.

Current denial lists are generally set up for a single system and lack cross-referencing with other denial lists. As such, the presence of an entity on one list does not necessarily propagate to another list for a similarly restricted system. The embodiments of the subject technology aggregate lists from various sources to identify and automatically improve the identification of an entity across multiple restricted systems' denial lists.

It will be appreciated in general that that the embodiments described above provide an advantage over conventional denial list systems and processes. Decomposing a name into parts that appears to have permitted access provides improved security by identifying entities that may be on lists of restricted access but obfuscated their name in some way. The decomposition of names and subsequent analysis of the name sub-parts allows the subject technology to identify variations of names that are blocked from access. Accordingly, the method successfully identifies more entities that are denied access to a restricted system.

The techniques described herein may be implemented in a number of ways. Example implementations are provided below with reference to the following figures.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

Overview

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

The present disclosure generally relates to systems and methods determining whether an entity has access status to a restricted system. In the subject disclosure that follows, embodiments disclose an automated system that analyzes a name across multiple lists of restricted access that are gathered from multiple sources. The analysis uses natural language processing to identify a name and parts of a name. The subject technology offers a better approach to evolve the knowledge included in the system. The system's performance regarding the deny/allow predictions/recommendations evolves by learning from the users' input (new records, etc.). A deep neural network element provides better performance than, for example, raw queries or fuzzy queries against a database, according to field tests. In some embodiments, the subject technology may combine multiple allowlist/denylist sources that permit tailoring the permissiveness of the system to block/no block requesting entities according to the administrators' needs or new requirements.

Figure 1:
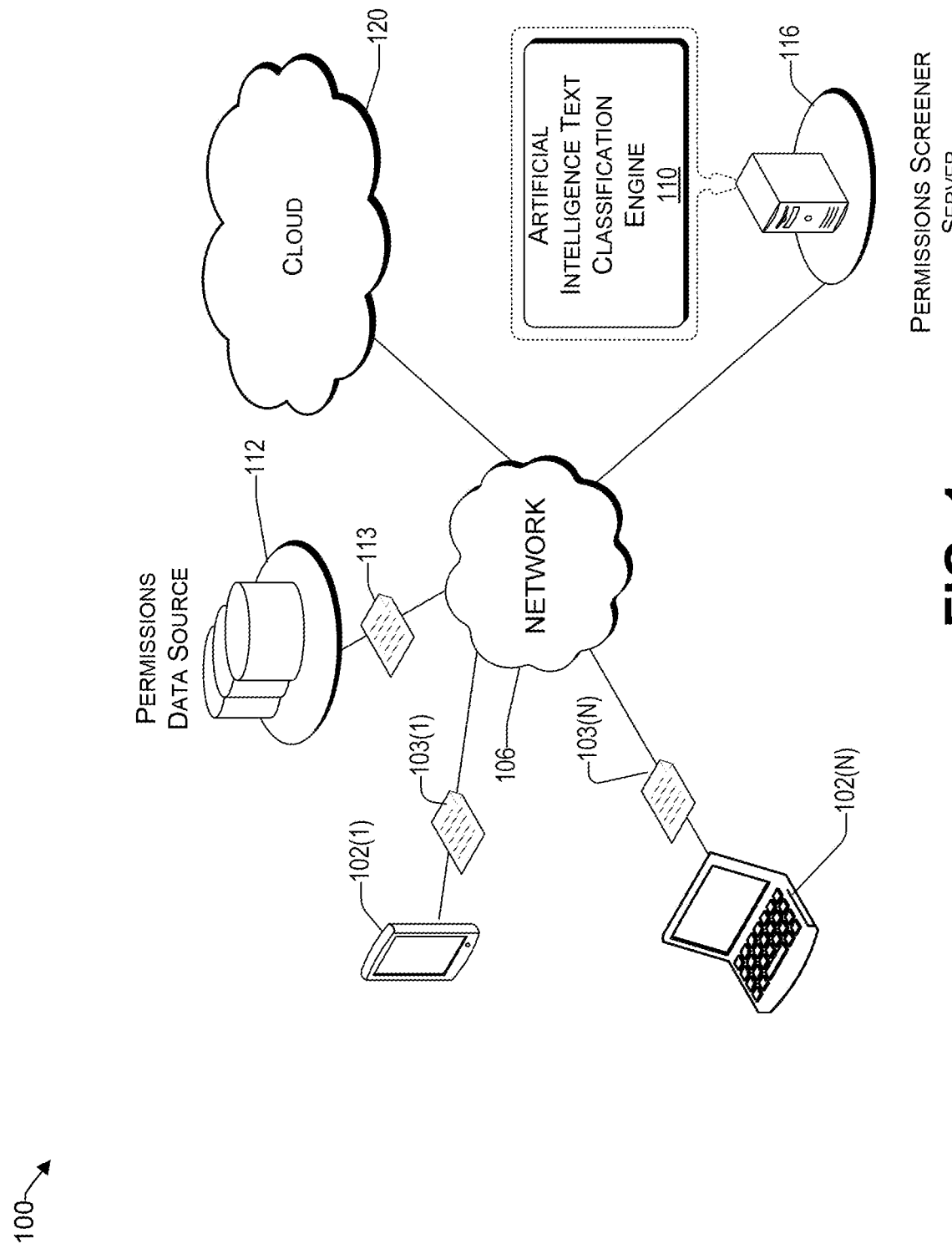
FIG. 1 is a block diagram of an architecture for determining network based access to restricted systems according to an embodiment.

In one aspect, the subject system enhances the computing labor in terms of reviewing allowed/denied users. The approach positively impacts the performance of the decisions related to allowing/denying users because the system's features evolve the data used, generate continuous learning from input, and use a neural NLP approach to recommend block/no block of users to the human reviewers. The system allows classifying unknown individuals/institutions, excelling especially in comparison to existing procedures to query databases Example Architecture FIG. 1 illustrates an example architecture 100 for determining network based access to restricted systems. Architecture 100 includes a network 106 that allows various computing devices 102(1) to 102(N) to communicate with each other, as well as other elements that are connected to the network 106, such as permissions data source 112, a permissions screener server 116, and the cloud 120.

The network 106 may be, without limitation, a local area network ("LAN"), a virtual private network ("VPN"), a cellular network, the Internet, or a combination thereof. For example, the network 106 may include a mobile network that is communicatively coupled to a private network, sometimes referred to as an intranet that provides various ancillary services, such as communication with various application stores, libraries, and the Internet. The network 106 allows an A.I. text classification engine 110, which is a software program running on the permissions screener server 116, to communicate with the permissions data source 112, computing devices 102(1) to 102(N), and the cloud 120, to provide data processing. The permissions data source 112 may provide allow/deny (or block/noblock) status data for different entities on different restricted systems' lists that will be processed under one or more techniques described here. In some embodiments, a data packet 113 may be received by the A.I. text classification engine 110 at predetermined intervals or upon a trigger event. This data packet 113 can be received by the A.I. text classification engine 110 by either a push operation from the permissions database 112 or from a pull operation of the A.I. text classification engine 110. In one embodiment, the data processing is performed at least in part on the cloud 120.

For purposes of later discussion, several user devices appear in the drawing, to represent some examples of the computing devices that may be the source of data being analyzed depending on the task chosen. Aspects of the symbolic sequence data (e.g., 103(1) and 103(N)) may be communicated over the network 106 with the update recommendation engine 110 of the permissions screener server 116. Today, user devices typically take the form of portable handsets, smart-phones, tablet computers, personal digital assistants (PDAs), and smart watches, although they may be implemented in other form factors, including consumer, and business electronic devices.

For example, a computing device (e.g., 102(1)) may send a request 103(N) to the A.I. text classification engine 110 to identify access status for an entity seeking access to a restricted system stored or managed in the computing device 102(N). This illustrates for example, a company checking if a potential vendor has access to a restricted third party service. In another example, the computing device 102(N) may send a request 103(N) to the A.I. text classification engine 110 to identify access status for an entity seeking access to a restricted system stored or managed in the computing device 102(N). This illustrates for example, an entity that manages a restricted system checking with the service of the subject disclosure to see if a third party wishing to access the restricted system of computing device 102(N) is on a deny or allow list.

While the permissions data source 112 and the A.I. text classification engine 110 are illustrated by way of example to be on different platforms, it will be understood that in various embodiments, the update data source 112 and the permissions screener server 116 may be combined. In other embodiments, these computing platforms may be implemented by virtual computing devices in the form of virtual machines or software containers that are hosted in a cloud 120, thereby providing an elastic architecture for processing and storage.

Example Block Diagram

Figure 2:
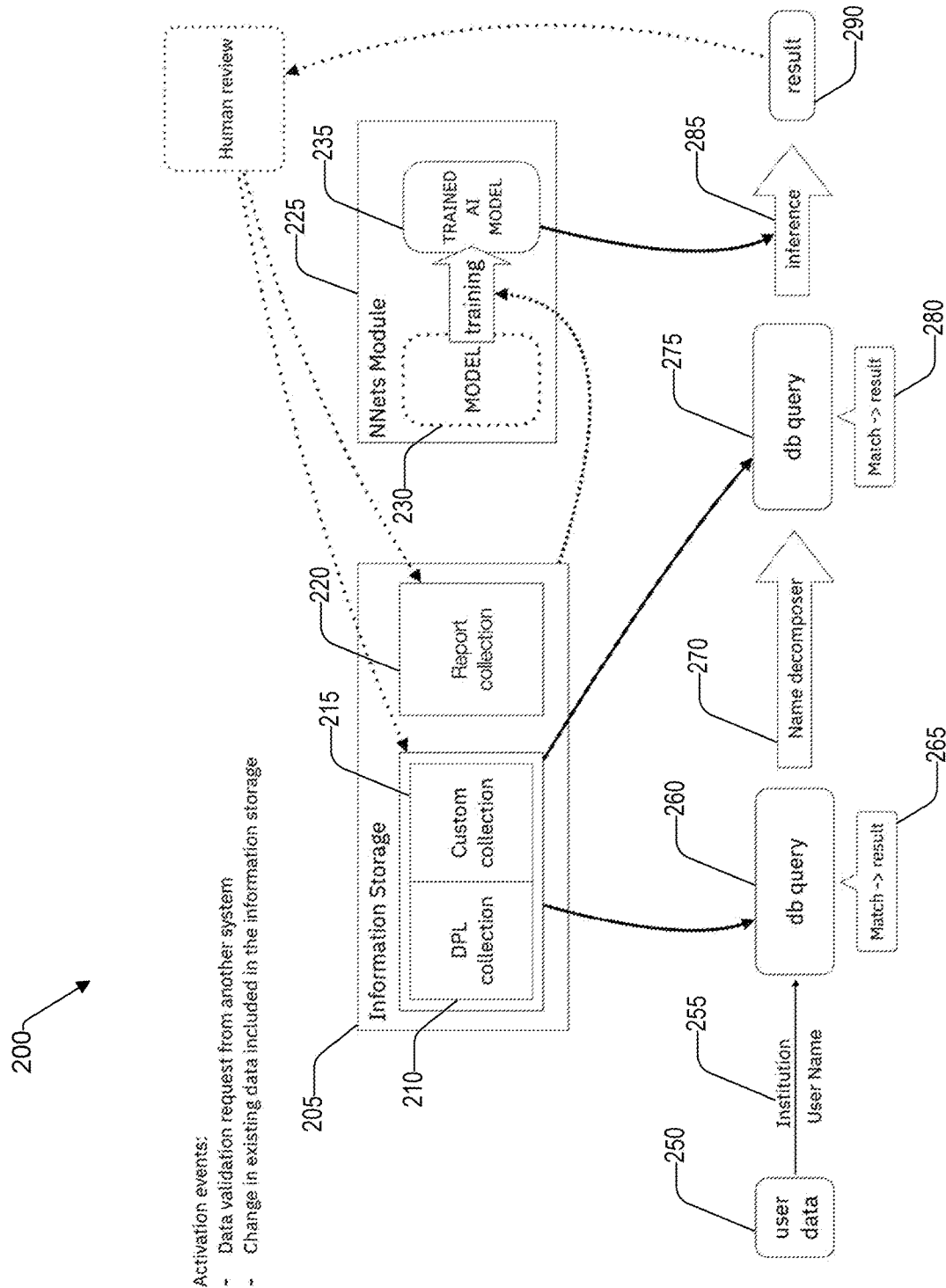
FIG. 2 is a block diagram of a system for determining network based access to restricted systems according to some embodiments.

Reference now is made to FIG. 2. A system 200 for determining network based access to restricted systems is shown according to an illustrative embodiment. The system 200 generally includes a database 205 and a neural network module 225 in communication with the database 205. The database 205 and the neural network module 225 are network connected with external computing devices (for example, as illustrated in FIG. 1). In one embodiment, information from the database 205 and the neural network module 225 are accessed in response to an external entity triggering a request for information. For example, the external entity may be inquiring as to whether a third party is permitted to access a restricted system. Access credentials to one or more restricted systems may be based on lists stored in the database 205.

In one embodiment, the database 205 may include a denied parties list (DPL) Collection/Deny list 210. The DPL 210 may include all the entries marked as blocked for one or more restricted systems. The access status of entities in the database 205 may be periodically updated for their permission access status flag to one or more of the restricted systems. The identification of the entities in the database 205 may be received from a plurality of different sources. As may be appreciated, in one aspect of the subject technology, an entity may be placed on a deny status because of various reasons. The access status originates from one source or reason. The database 205 may aggregate from the different sources updated or newly added names of entities that have been flagged for restricted access to different systems. In some embodiments, the database 205 may include a custom collection module 215. The custom collection module 215 may include a list(s) of entities whose access status to one or more restricted systems is individually configured in the database 205. For example, entities in the custom collection module 215 that may be marked as blocked or not blocked for specific restricted systems. This collection may be used to add exceptions and corner cases not included in the DPL 210. The information included in the DPL 210 and in the custom collection module 215 may be augmented or curated synthetically using a series of heuristics (for example, by swapping pairs of institution/country labels, removing unneeded symbols, removing unneeded acronyms, removing company-related denominations, etc.).

Embodiments may include an application programming interface (API). The API manages the data flow from the input, the system elements, and the output. The API may be accessed via devices 102 (FIG. 1) when an external entity wants to check the access status of a party seeking access to one of the restricted systems. The entity checking access status may be a person or an automated software program. When the entity makes a request for status access, the API may initiate a process described by the flow below the database 205 shown in FIG. 2. The requesting entity maybe represented by block 250. The requesting entity may input for example, the name 255 of an institution or user for whom access status is being checked. The request accesses the database 205 (shown as database query 260) for the name of the party being checked. The deny or permit access result 265 may be produced from the database query 260. Where the name extracted from the request was not definitively located in the database 205, in some embodiments, the system 200 may perform a process that checks for pseudonyms or alternate spellings of names. The name being checked may be submitted to a decomposer module 270 that breaks the name into parts. The API may check (database query 275) each part to see if any of the parts match (280) an entity in the database 205.

Some embodiments may also include an artificial intelligence process that processes the parts of the name using natural language processing to predict whether the name may be one of the entities in the database 205. The neural network module 225 may be accessed when a definitive match between the decomposed parts of the name do not definitively match an entity in the database 205. The neural network module 225 may be designed for text classification. An A.I model 235 in the neural network module 225 may be trained using the data from the database 205. The neural network module 225 may include a prediction model 230 that generates an inference 285 from the received name or its decomposed parts based on the A.I. model 235. A result 290 may be for example, that the name is flagged as a denied entity, permitted entity, or recommended as being denied or permitted. In some embodiments, the content of the custom collection 215, the report collection 220, and/or the result 290 may be forwarded to a person for human review and validation.

Some embodiments may also periodically check whether the status of entities has changed in the database 205. Some embodiments may include a refresh process that rechecks whether entities in the database 205 should be reviewed for access status when information related to one or more of the entities is changed or updated.

The results from matching submitted names, matching partial names, and predictions of the A.I. model may be stored in the report collection database 220, to be used in the future to train the prediction model 230.

Example Methodology

Figure 3:
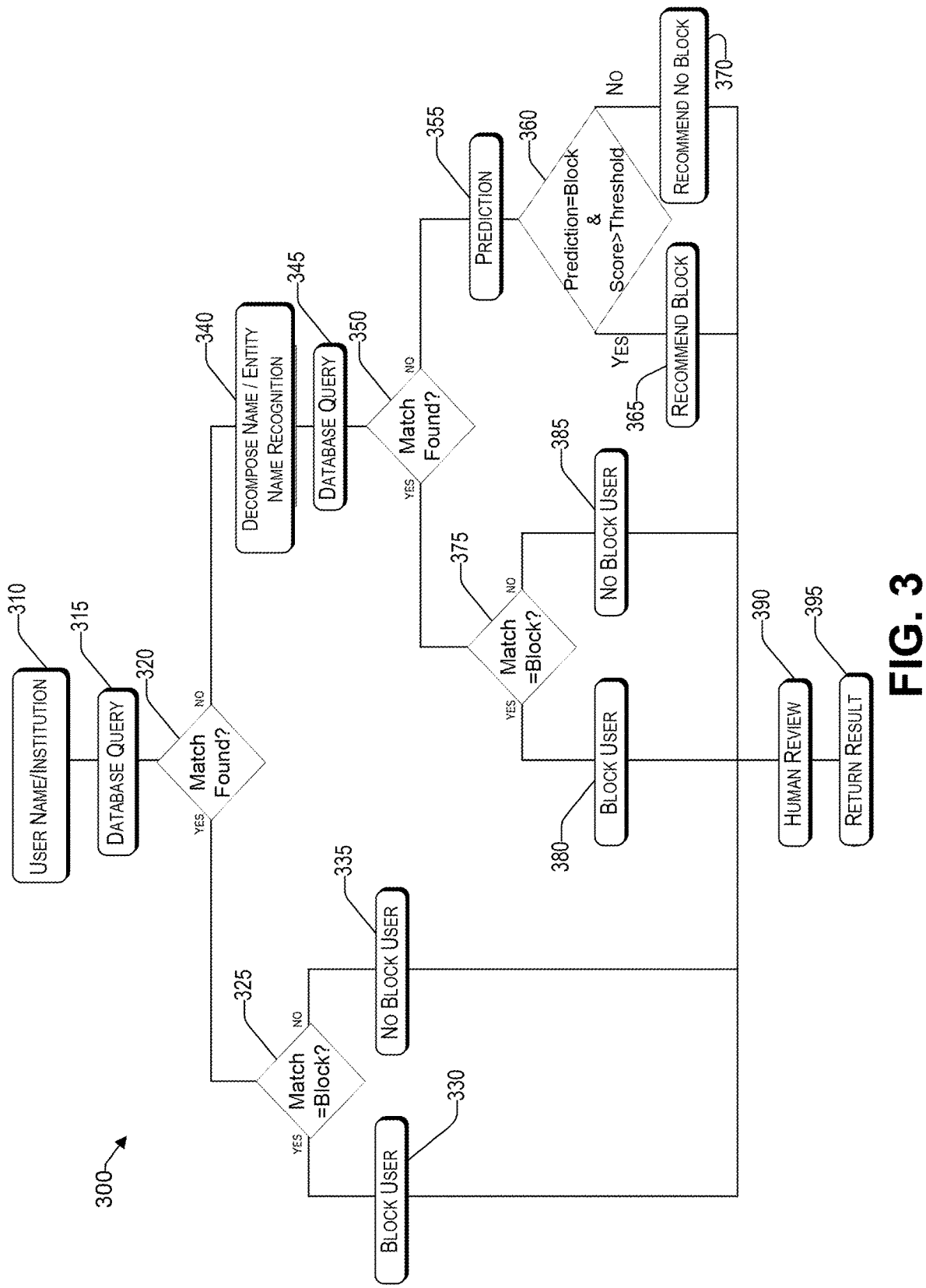
FIG. 3 is a flowchart of a method for determining network based access to restricted systems according to an embodiment.

Referring now to FIG. 3, a method 300 for determining network based access to restricted systems is shown according to an illustrative embodiment. The method 300 may be triggered in response to a request for access permission to a restricted system. The requesting party may be, for example, the party seeking access, a third party, or an administrator or other entity affiliated with the restricted system. A computer server, for example, the artificial intelligence text classification server of FIG. 1, may serve as the device fielding the request and implementing the following process steps.

The server may extract 310 the name of the subject party whose access status is being checked. For example, a company, institution, or individual may be included in the request. The name of the company, institution, or individual may be extracted out from any other information accompanying the request. In some embodiments, the submitted name may be included without any other information (for example, when input through an API in a field designated as the name being checked).

The server may initiate 315 a query to a database of entities flagged for denial or permission to various restricted systems. In some embodiments, entities may be flagged with restricted or partial access to some systems. The database may be, for example, the database 205 of FIG. 2. A restricted system may be a network connected service that either includes permission to access or includes a clearance indicating that an outside entity is not flagged as unqualified or prohibited from accessing the contents of the service.

The query may compare 320 the name extracted from the request to one or more lists stored in the database. If the name matches an entity in one of the lists, the server may check 325 if the entity is flagged as being blocked from accessing the restricted system in the request. If the entity is flagged as being blocked for that restricted system, the server may return a message denying 330 access to the restricted system. If the name is not flagged as being blocked, the server may indicate 335 to the requesting party that the name has permission for access.

In some embodiments, if the server cannot match the name to one of the entities in the various lists in the database, another process may attempt to check if the requested name is similar or an alternate variation of a blocked entity. For example, some names may include articles ("the", "a", "an") in different variations of a company or institutional name. The inclusion or exclusion or parts to a name may result in some submitted names not matching a blocked entity. Or some individuals go by aliases that include or exclude one or more names. In one embodiment, the server may decompose 340 the submitted name into parts (for example, by words or by separate names). The name may be decomposed in sub-string units by using separator characters (For example, a comma (,), etc.).

The server may query 345 the different parts or sub pieces of the submitted name for matches in the database of entity denials/permissions lists. The server may determine 350 whether one of the parts matches one or more of the entities in the database. If the name matches an entity in one of the lists, the server may check 375 if the entity is flagged as being blocked from accessing the restricted system in the request. If the entity is flagged as being blocked for that restricted system, the server may return a message denying 380 access to the restricted system. If the name is not flagged as being blocked, the server may indicate 385 to the requesting party that the name has permission for access.

Some embodiments may include an A.I. component to help identify names that may not definitively match an existing entity entry in the deny/permit lists. For example, if one of the parts of the decomposed name does not definitively match an entity in the database, the name and its parts may be transferred to a deep neural network to analyze the name and name parts. The neural network engine may process the name data to make a prediction about whether the submitted name should be classified as one of the entities in the database with either denied or permitted access to a restricted system.

In some embodiments, the results of the prediction classification may be reviewed 390 by a human user and validated 395 for the accuracy of the result. Some embodiments may use human verification to validate the results from the name checking and decomposed name checking processes as part of a supervised machine learning process that iteratively improves the model as more input is received by the neural network engine.

Figure 4:
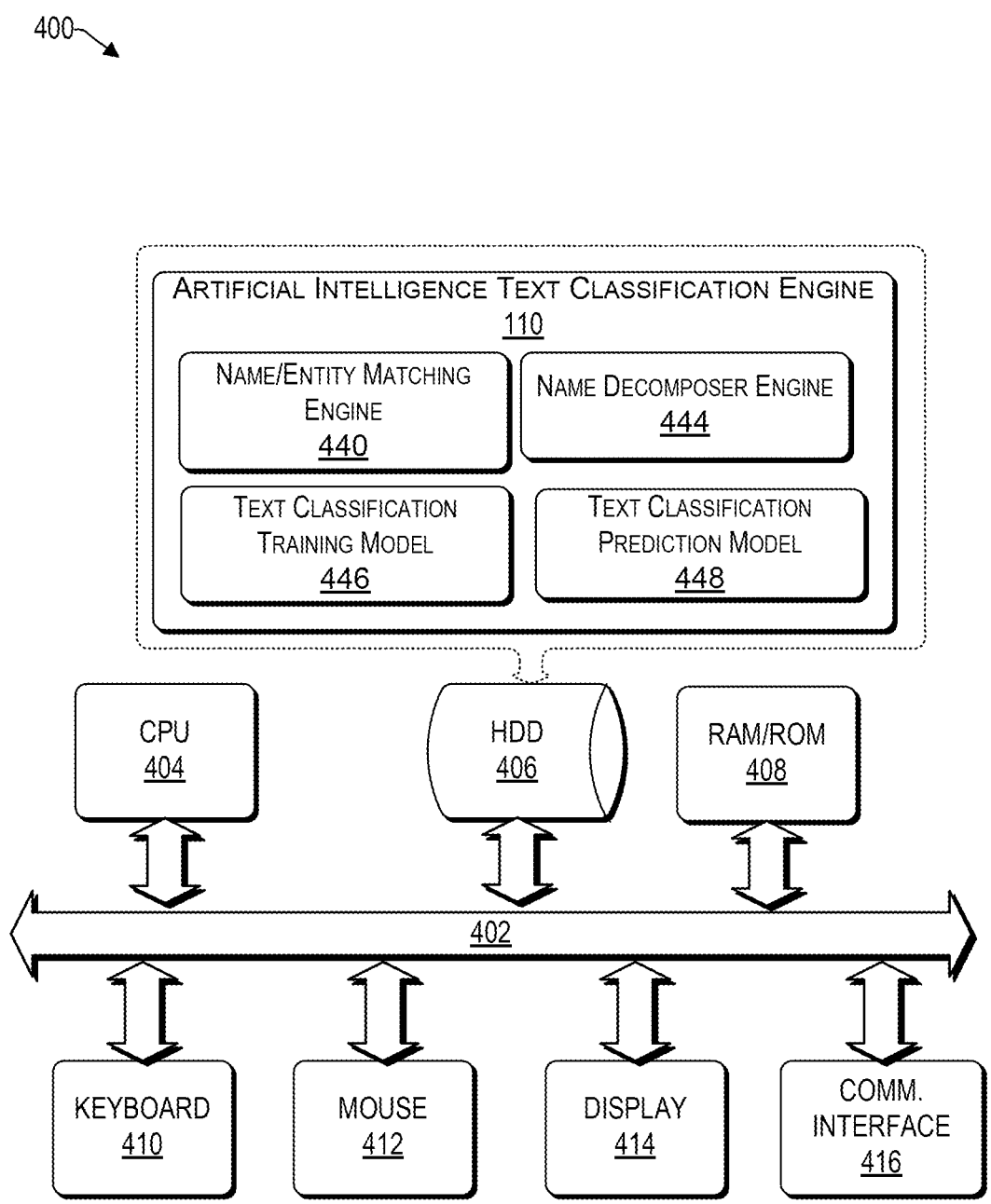
FIG. 4 is a functional block diagram illustration of a computer hardware platform that can communicate with various networked components.

In some embodiments, for every new check performed against the database of entities and entities' access status, if an entity's information has changed, the system may run all the tests again using that new information. For example, if a name changes in the database, the system runs new checks to see whether this new version of the name should be blocked or not. When the lists' information changes, in a new round of checking names, the new information will be considered to re-run the needed checks Example Computer Platform As discussed above, functions relating to interpretable modeling of the subject disclosure can be performed with the use of one or more computing devices connected for data communication via wireless or wired communication, as shown in FIG. 1. FIG. 4 is a functional block diagram illustration of a computer hardware platform that can communicate with various networked components, such as a training input data source, the cloud, etc. In particular, FIG. 4 illustrates a network or host computer platform 400, as may be used to implement a server, such as the artificial intelligence text classification server 116 of FIG. 1.

The computer platform 400 may include a central processing unit (CPU) 404, a hard disk drive (HDD) 406, random access memory (RAM) and/or read only memory (ROM) 408, a keyboard 410, a mouse 412, a display 414, and a communication interface 416, which are connected to a system bus 402.

In one embodiment, the HDD 406, has capabilities that include storing a program that can execute various processes, such as the artificial intelligence text classification engine 110, in a manner described herein. Generally, the artificial intelligence text classification engine 110 may be configured to analyze names submitted for access status to restricted systems under the embodiments described above. The artificial intelligence text classification engine 110 may have various modules configured to perform different functions. In some embodiments, the artificial intelligence text classification engine 110 may include sub-modules. For example, a name/entity matching engine 440, a name decomposer engine 444, a text classification training model 446, and a text classification prediction model 448.

Example Cloud Platform

As discussed above, functions relating to checking for access status to a restricted system, may include a cloud 120 (see FIG. 1). It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
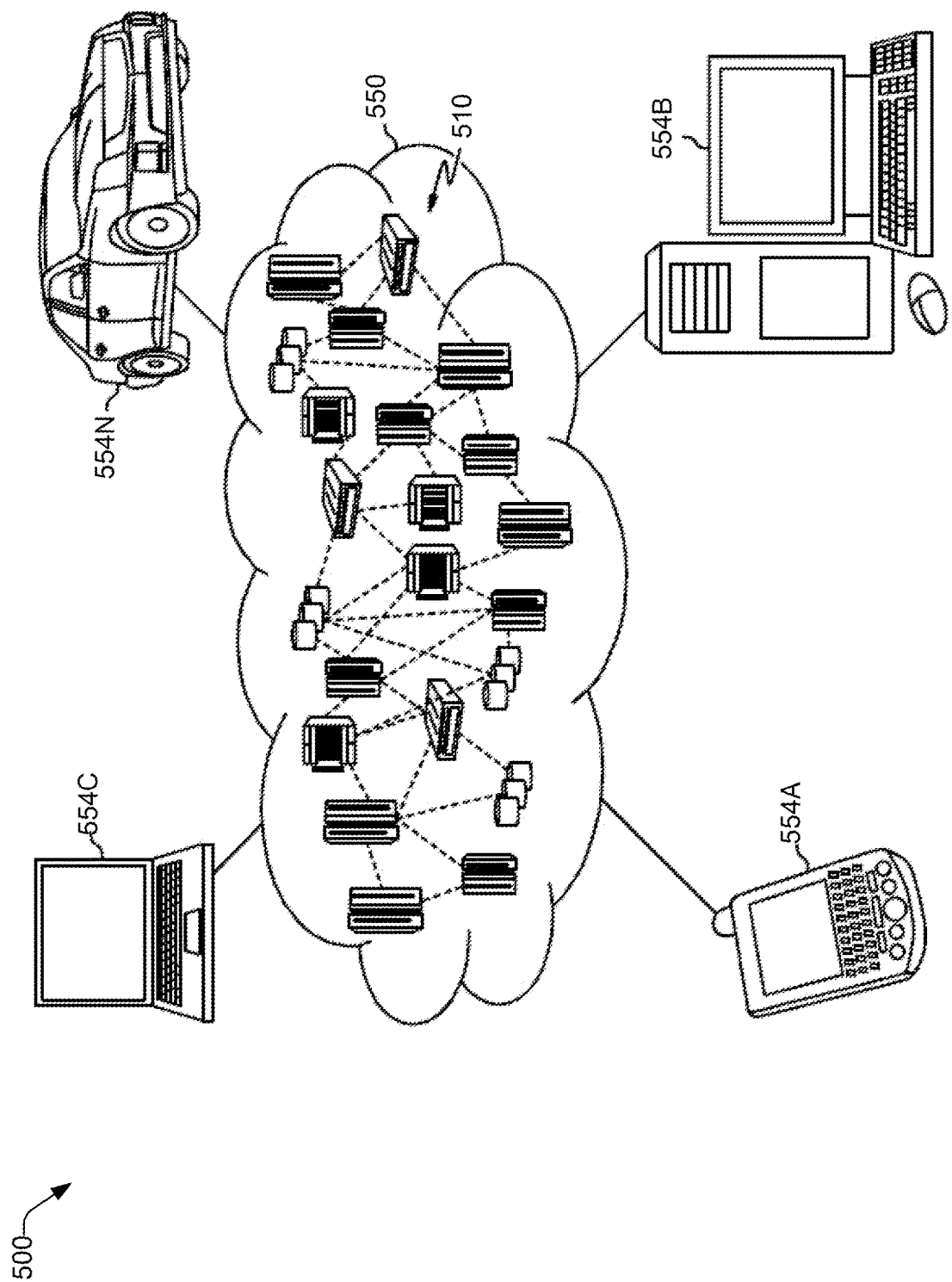
FIG. 5 depicts a cloud computing environment, consistent with an illustrative embodiment.

Referring now to FIG. 5, an illustrative cloud computing environment 500 is depicted. As shown, cloud computing environment 500 includes one or more cloud computing nodes 510 with which local computing devices used by cloud consumers, such as, for example, personal digital assistant (PDA) or cellular telephone 554A, desktop computer 554B, laptop computer 554C, and/or automobile computer system 554N may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 510 and cloud computing environment 550 can communicate with any type of computerized device over any type of network and/or network addressable connection (e.g., using a web browser).

Figure 6:
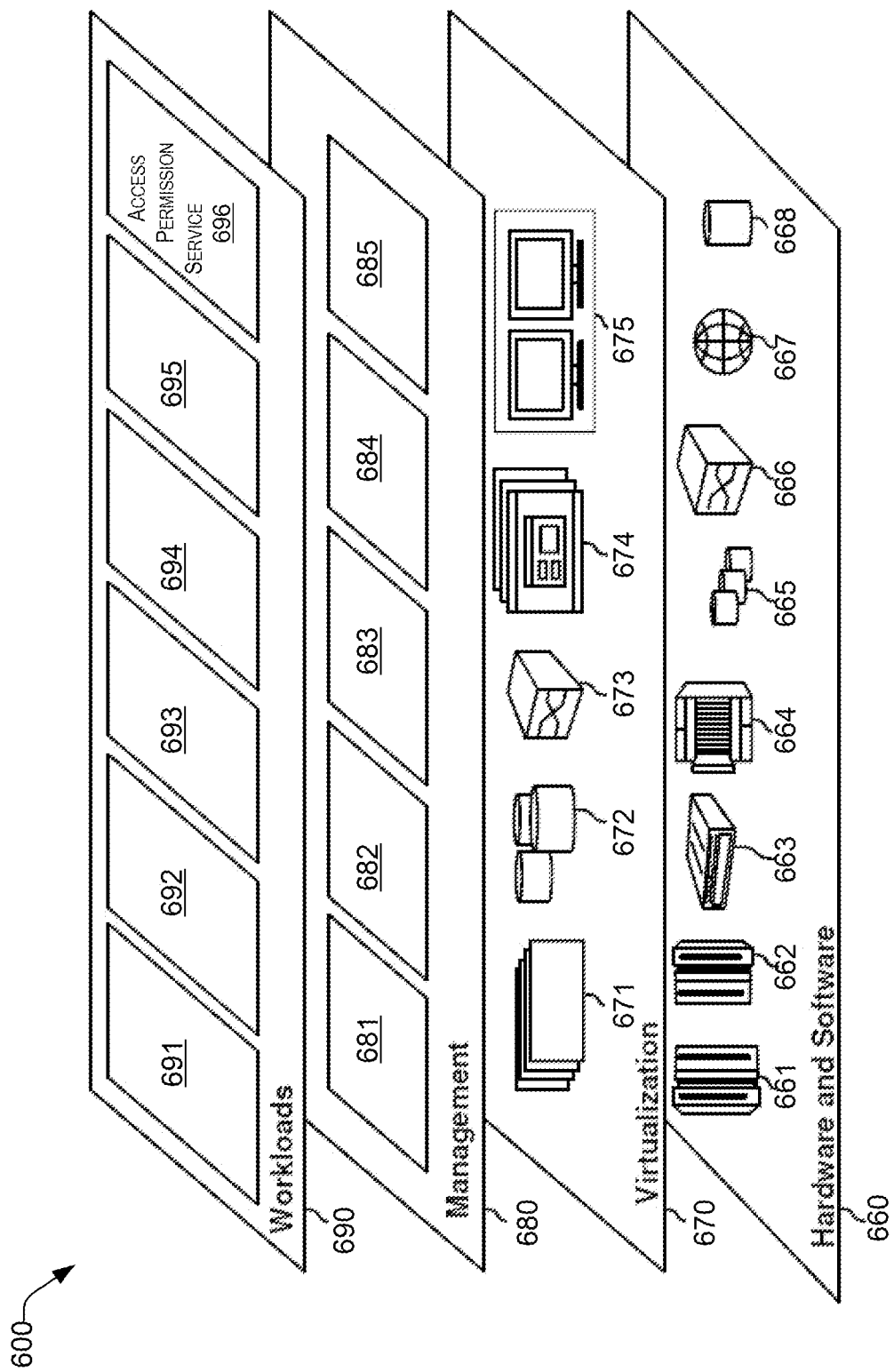
FIG. 6 depicts abstraction model layers, consistent with an illustrative embodiment.

Referring now to FIG. 6, a set of functional abstraction layers provided by cloud computing environment 550 (FIG. 5) is shown. It should be understood in advance that the components, layers, and functions shown in FIG. 6 are intended to be illustrative only and embodiments of the disclosure are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and access permission service 696, as discussed herein.

Conclusion

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to call flow illustrations and/or block diagrams of a method, apparatus (systems), and computer program products according to embodiments of the present disclosure. It will be understood that each step of the flowchart illustrations and/or block diagrams, and combinations of blocks in the call flow illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the call flow process and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the call flow and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the call flow process and/or block diagram block or blocks.

The flowchart and block diagrams in the Figures illustrate the architecture, functionality, and operation of possible implementations of systems, methods, and computer program products according to various embodiments of the present disclosure. In this regard, each block in the call flow process or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or call flow illustration, and combinations of blocks in the block diagrams and/or call flow illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method for determining network based access to restricted systems, comprising:
   receiving a request for a permission access status of a party seeking access to one of the restricted systems;
   accessing a database in a computer server, wherein the database includes a periodically updated list of entities;
   extracting a name of the party from the request;
   determining whether the name does not match one of the entities in the periodically updated list of entities;
   decomposing the name into parts in response to the name not matching one of the entities;
   determining whether any of the parts of the name match one or more of the entities in the periodically updated list of entities; and
   forwarding, from the computer server to an external computing device, a denial of access status, in response to the any of the parts of the name matching one of the entities in the periodically updated list of entities.

2. The method of claim 1, further comprising:
   in response to any of the parts not matching one of the entities in the periodically updated list of entities, forwarding the name and its parts to a neural network model;
   predicting, by the neural network model, whether the name or any of the parts is one of the entities in the periodically updated list of entities; and
   recommending, by an engine operating the neural network model, to flag the extracted name as one of the entities in the periodically updated list of entities.

3. The method of claim 2, further comprising recommending, by the engine operating the neural network model, to flag the extracted name as having a permitted access status in response to the neural network model predicting that the name or none of its parts match one of the entities in the periodically updated list of entities.

4. The method of claim 1, further comprising forwarding, from the computer server to the external computing device, a message indicating that the extracted name has a permitted access status, in response to the name not matching one of the entities in the periodically updated list of entities.

5. The method of claim 1, wherein the database includes one or more denied parties lists (DPL), wherein the DPL are based on entities flagged for denied access to the one or more restricted systems.

6. The method of claim 1, wherein the database includes a custom collection of entities flagged with exceptions indicating an allowed access status to the one or more of the restricted systems.

7. The method of claim 1, further comprising receiving updated permission access statuses of the entities from a plurality of different sources.

8. A computer program product for determining network based access to restricted systems, the computer program product comprising:
   one or more non-transient computer readable storage media, and program instructions collectively stored on the one or more computer readable storage media, the program instructions comprising:
   receiving a request for a permission access status of a party seeking access to one of the restricted systems;
   accessing a database in a computer server, wherein the database includes a periodically updated list of entities;
   extracting a name of the party from the request;
   determining whether the name does not match one of the entities in the periodically updated list of entities;
   decomposing the name into parts in response to the name not matching one of the entities;
   determining whether any of the parts of the name match one or more of the entities in the periodically updated list of entities; and
   forwarding, from the computer server to an external computing device, a denial of access status, in response to the any of the parts of the name matching one of the entities in the periodically updated list of entities.

9. The computer program product of claim 8, wherein the program instructions further comprise:
   in response to any of the parts not matching one of the entities in the periodically updated list of entities, forwarding the name and its parts to a neural network model;
   predicting by the neural network model, whether the name or any of the parts is one of the entities in the periodically updated list of entities; and
   recommending, by an engine operating the neural network model, to flag the extracted name as one of the entities in the periodically updated list of entities.

10. The computer program product of claim 9, wherein the program instructions further comprise recommending, by the engine operating the neural network model, to flag the extracted name as having a permitted access status in response to the neural network model predicting that the name or none of the parts matches one of the entities in the periodically updated list of entities.

11. The computer program product of claim 8, wherein the program instructions further comprise forwarding, from the computer server to the external computing device, a message indicating that the extracted name has a permitted access status, in response to the name not matching one of the entities in the periodically updated list of entities.

12. The computer program product of claim 8, wherein the database includes one or more denied parties lists (DPL), wherein the DPL are based on entities flagged for denied access to the one or more restricted systems.

13. The computer program product of claim 8, wherein the database includes a custom collection of entities flagged with exceptions indicating an allowed access status to the one or more of the restricted systems.

14. The computer program product of claim 8, wherein the program instructions further comprise receiving updated permission access statuses of the entities from a plurality of different sources.

15. A computer server for determining network based access to restricted systems, comprising:
- a network connection;
- one or more computer readable storage media;
    - a processor coupled to the network connection and coupled to the one or more computer readable storage media; and
    - a computer program product comprising program instructions collectively stored on the one or more computer readable storage media, the program instructions comprising:
- receiving a request for a permission access status of a party seeking access to one of the restricted systems;
- accessing a database in the computer server, wherein the database includes a periodically updated list of entities;
- extracting a name of the party from the request;
- determining whether the name does not match one of the entities in the periodically updated list of entities;
- decomposing the name into parts in response to the name not matching one of the entities;
- determining whether the name or any of its parts match one or more of the entities in the periodically updated list of entities; and
- forwarding, from the computer server to an external computing device, a denial of access status, in response to the any of the parts of the name matching one of the entities in the periodically updated list of entities.

16. The computer server of claim 15, wherein the program instructions further comprise:
- in response to any of the parts not matching one of the entities in the periodically updated list of entities, forwarding the name and its parts to a neural network model;
- predicting by the neural network model, whether the name or any of the parts may be one of the entities in the periodically updated list of entities; and
- recommending, by an engine operating the neural network model, to flag the extracted name as one of the entities in the periodically updated list of entities.

17. The computer server of claim 16, wherein the program instructions further comprise recommending, by the engine operating the neural network model, to flag the extracted name as having a permitted access status in response to the neural network model predicting that the name or none of the parts matches one of the entities in the periodically updated list of entities.

18. The computer server of claim 15, wherein the program instructions further comprise forwarding, from the computer server to the external computing device, a message indicating that the extracted name has a permitted access status, in response to the name not matching one of the entities in the periodically updated list of entities.

19. The computer server of claim 15, wherein the database includes a custom collection of entities flagged with exceptions indicating an allowed access status to the one or more of the restricted systems.

20. The computer server of claim 15, wherein the program instructions further comprise receiving updated permission access statuses of the entities from a plurality of different sources.

* * * * *